US012589527B2

(12) United States Patent
Zhu et al.

(10) Patent No.: US 12,589,527 B2
(45) **Date of Patent: \*Mar. 31, 2026**

(54) COMPOSITE RELEASE FILMS, AND DEVICES AND METHODS USING COMPOSITE RELEASE FILM IN FIELD OF ADDITIVE MANUFACTURING

(71) Applicant: LUXCREO (BEIJING) INC., Beijing (CN)

(72) Inventors: Guang Zhu, Ningbo (CN); Wen Fan, Ningbo (CN); Zhengwei Wan, Ningbo (CN); Yutong Wu, Ningbo (CN)

(73) Assignee: LUXCREO (BEIJING) INC., Beijing (CN)

( * ) Notice: Subject to any disclaimer, the term of this patent is extended or adjusted under 35 U.S.C. 154(b) by 78 days.

This patent is subject to a terminal disclaimer.

(21) Appl. No.: 18/638,691

(22) Filed: Apr. 18, 2024

(65) Prior Publication Data

US 2024/0262018 A1 Aug. 8, 2024

Related U.S. Application Data

(63) Continuation of application No. 17/811,073, filed on Jul. 7, 2022, now Pat. No. 11,981,056, which is a
(Continued)

(51) Int. Cl.
*B29C 33/68* (2006.01)
*B29C 64/124* (2017.01)
(Continued)

(52) U.S. Cl.
CPC ............ *B29C 33/68* (2013.01); *B29C 64/124* (2017.08); *B29C 64/245* (2017.08); *B33Y 10/00* (2014.12); *B33Y 30/00* (2014.12)

(58) Field of Classification Search
CPC ... B29C 64/124; B29C 64/129; B29C 64/135; B29C 64/245; B29C 33/68; B33Y 10/00; B33Y 30/00
See application file for complete search history.

(56) References Cited

U.S. PATENT DOCUMENTS 7,438,846 B2    10/2008 Hendrik
11,981,056 B2 *  5/2024 Zhu ........................ B29C 64/245
(Continued)

FOREIGN PATENT DOCUMENTS

CN    105034138 A    11/2015
CN    108381918 A    8/2018
(Continued)

OTHER PUBLICATIONS

International Search Report in PCT/CN2020/136861 mailed on Mar. 22, 2021, 6 pages.
(Continued)

*Primary Examiner* — JaMel M Nelson
(74) *Attorney, Agent, or Firm* — METIS IP LLC

(57) ABSTRACT

A composite release film may be configured to separate a current cured layer from a photocuring surface during a photocuring three-dimensional (3D) printing process. The composite release film may include a plastic layer and an elastic layer. An upper surface of the plastic layer may be the photocuring surface, and a lower surface of the plastic layer may fit with an upper surface of the elastic layer. The elastic layer may include an elastic medium of the elastic layer and a reinforcing scaffold. The elastic medium of the elastic layer may be filled in pores of the reinforcing scaffold. The reinforcing scaffold in the elastic layer may include a plurality of protrusions on a lower surface of the elastic layer. In addition, a device and a method using the composite release film to prepare a 3D object through a photocuring 3D
(Continued)

printing technique in the field of additive manufacturing are disclosed.

20 Claims, 3 Drawing Sheets

Related U.S. Application Data continuation of application No. PCT/CN2020/136861, filed on Dec. 16, 2020.

(60) Provisional application No. 62/958,606, filed on Jan. 8, 2020, provisional application No. 62/958,062, filed on Jan. 7, 2020.

(51) Int. Cl.
| | | |
|---|---|---|
| *B29C 64/245* | (2017.01) | |
| *B33Y 10/00* | (2015.01) | |
| *B33Y 30/00* | (2015.01) | |

(56) References Cited

U.S. PATENT DOCUMENTS

| | | | |
|---|---|---|---|
| 2012/0231223 A1 | 9/2012 | Lee et al. | |
| 2017/0197363 A1* | 7/2017 | Frantzdale | ........... B29C 64/245 |
| 2018/0126644 A1* | 5/2018 | Slaczka | .................. B32B 25/04 |
| 2020/0101658 A1 | 4/2020 | Yao | |
| 2020/0247037 A1 | 8/2020 | Schmid | |

FOREIGN PATENT DOCUMENTS

| | | |
|---|---|---|
| CN | 108748980 A | 11/2018 |
| CN | 108943697 A | 12/2018 |
| EP | 2241430 A1 | 10/2010 |
| KR | 20190119224 A | 10/2019 |
| WO | 2016115236 A1 | 7/2016 |

OTHER PUBLICATIONS

Written Opinion in PCT/CN2020/136861 mailed on Mar. 22, 2021, 7 pages.

The Extended European Search Report in European Application No. 20911897.5 mailed on Jan. 3, 2023, 9 pages.

Notification to Grant Patent Right for Invention in Chinese Application No. 202080027498.4 mailed on May 22, 2023, 4 pages.

The Second Office Action in Chinese Application No. 202080027498.4 mailed on Apr. 5, 2023, 46 pages.

\* cited by examiner

COMPOSITE RELEASE FILMS, AND DEVICES AND METHODS USING COMPOSITE RELEASE FILM IN FIELD OF ADDITIVE MANUFACTURING

CROSS-REFERENCE TO RELATED APPLICATIONS

The present application is a continuation of U.S. application Ser. No. 17/811,073, filed on Jul. 7, 2022, which is a Continuation of International Application No. PCT/CN2020/136861 filed on Dec. 16, 2020, which claims priority of U.S. Provisional Application No. 62/958,062 filed on Jan. 7, 2020, and U.S. Provisional Application No. 62/958,606, filed on Jan. 8, 2020, the contents of each of which are hereby incorporated by reference in its entirety.

TECHNICAL FIELD

The present disclosure relates to the field of additive manufacturing, and more specifically, relates to composite release films, and devices and methods using the composite release film in the field of additive manufacturing.

BACKGROUND

With the development of computer and mechanical science and technology, various additive manufacturing techniques or three-dimensional (3D) printing techniques have developed rapidly. Generally speaking, the technical principle of the additive manufacturing techniques or the 3D printing technology techniques may include layering a 3D model of an object constructed by software (e.g., computer-aided design (CAD)), obtaining contour information or image information of each layer of the 3D model, and manufacturing the 3D object by printing layer by layer using bindable materials (e.g., powder metal, resin, etc.). As one of the additive manufacturing techniques, a photocuring 3D printing technique mainly uses liquid resin as raw materials, and completes a printing process by using a characteristic that the printing raw material (e.g., the liquid resin) is cured under irradiation of light with a specific wavelength and intensity. The photocuring 3D printing usually includes following operations. Firstly, the 3D model is layered in one direction to obtain the contour information or the image information of each layer of the 3D model, and then a light pattern of each layer is irradiated on the printing raw material. After the printing raw material is irradiated by light, a curing reaction occurs to form a cured layer. After the light pattern of the layer is cured, a next layer is cured. The operations are repeated, and finally, a complete printed part (i.e., the 3D model) is formed.

The photocuring 3D printing technique may include two types. A first type of the photocuring 3D printing technique is referred to as a top-down printing. In the top-down printing, a curing light source is located above a resin tank storing the printing raw material (e.g., the liquid resin). After each layer is cured, a printing and build platform is moved down a certain distance. In the top-down printing, the photocuring occurs on a surface of the liquid resin, so a printing height is defined by a depth of the resin tank. Generally speaking, an amount of the liquid resin to be placed in the resin tank is far more than an amount of really cured resin, which may cause a certain waste of the raw material. In addition, the top-down printing usually needs to be equipped with a liquid level control system (e.g., a coating scraper) to help the liquid resin flow until the liquid resin covers a completed cured layer. The cost of the printing device is high and operations of the printing device are complex. A second type of the photocuring 3D printing technique is a bottom-up printing. In the bottom-up printing, the curing light source is placed under the resin tank, and the photocuring occurs at a bottom portion of the resin tank. After each layer is cured, the printing and build platform is moved up a certain distance to drive a printed part to move up. If a viscosity of the liquid resin is not very large, the gravity may drive the liquid resin to flow back, thereby filling a space caused by the upward movement of the printed part so as to cure a next layer. The bottom-up printing needs no liquid level control system, and the cost of the printing device is relatively low. However, the bottom-up printing also has defects. For example, each time the build platform moves up after curing, the cured layer and the photocuring surface at the bottom portion of the resin tank need to be separated, which may cause damage to a fine structure of the cured layer. In addition, the separation process also seriously restricts a printing speed. In the prior art, a release film made of an elastic polymer material and placed on the bottom portion of the resin tank is usually used to facilitate rapid and non-destructive release. For example, an elastic separation layer technique is disclosed in U.S. Pat. No. 7,438,846.

In addition, some improved bottom-up printing techniques may be disclosed. For example, a continuous liquid interface production (CLIP), generated by carbon company in the United States, uses a transparent and breathable Teflon film as a bottom material of the resin tank for light and oxygen to pass through. Due to inhibition effect of oxygen, the oxygen entering the resin tank inhibits the photocuring of the liquid resin nearest to the bottom portion of the resin tank. Therefore, a thin liquid film (referred to as "dead zone") may be formed at the bottom portion of the resin tank. The cured layer cured above the dead zone is no longer separated from the resin tank, but separated from a liquid film in the dead zone, thereby increasing the printing speed to realize continuous printing. The CLIP also has some defects. For example, the dead zone is very sensitive to temperature, and small temperature fluctuations may cause printing failure. In addition, an oxygen content in the dead zone also needs to be accurately controlled, which complicates operations of the printing device and increases the cost.

Therefore, the photocuring 3D printing needs better alternative devices and printing techniques, especially for a solution of cured layer separation in the bottom-up printing.

SUMMARY

In an aspect of the present disclosure, a composite release film is disclosed. The composite release film may be configured to separate a current cured layer from a photocuring surface during a photocuring three-dimensional (3D) printing process, wherein the composite release film includes a plastic layer and an elastic layer, an upper surface of the plastic layer being the photocuring surface, and a lower surface of the plastic layer fitting with an upper surface of the elastic layer.

In some embodiments, the elastic layer may include an elastic medium of the elastic layer and a reinforcing scaffold. The elastic medium of the elastic layer may be filled in pores of the reinforcing scaffold.

In some embodiments, the reinforcing scaffold in the elastic layer may include a plurality of protrusions on a lower surface of the elastic layer.

In some embodiments, a resistance to swelling of a material of the plastic layer may be better than a resistance to swelling of a material of the elastic layer.

In some embodiments, an elastic modulus of the material of the plastic layer may be larger than an elastic modulus of the material of the elastic layer material.

In some embodiments, a ratio of a difference between the elastic modulus of the material of the plastic layer and the elastic modulus of the material of the elastic layer to the elastic modulus of the material of the elastic layer may be not larger than 20%.

In some embodiments, an elastic modulus of a material of the reinforcing scaffold in the elastic layer may be larger than an elastic modulus of a material of the elastic medium of the elastic layer.

In some embodiments, a ratio of a difference between the elastic modulus of the material of the reinforcing scaffold in the elastic layer and the elastic modulus of the material of the elastic medium of the elastic layer to the elastic modulus of the material of the elastic medium of the elastic layer is not larger than 20%.

In some embodiments, a thickness of the plastic layer may be less than a thickness of the elastic layer.

In some embodiments, the material of the plastic layer may include polytetrafluoroethylene (PTFE) or fluorinated ethylene propylene (FEP).

In some embodiments, the material of the elastic medium of the elastic layer may include polydimethylsiloxane (PDMS), polyurethane, or rubber.

In some embodiments, the material of the reinforcing scaffold in the elastic layer includes porous PTFE or porous FEP.

In some embodiments, an average height of the plurality of protrusions on the lower surface of the elastic layer that is included in the reinforcing scaffold is within a range of 100 nanometers to 20 microns.

In another aspect of the present disclosure, a device for photocuring 3D printing is disclosed. The device may include a resin tank, configured to contain raw materials for printing including photocurable liquid resin, a bottom surface of the resin tank being transparent; a composite release film placed on a bottom portion of the resin tank, configured to separate a current cured layer from a photocuring surface, the composite release film including a plastic layer and an elastic layer, wherein an upper surface of the plastic layer is the photocuring surface that is a contact surface with the liquid resin, and a lower surface of the plastic layer fits with an upper surface of the elastic layer; a build platform, a space between the build platform and the upper surface of the plastic layer of the composite release film being a printing region; and a light source, configured to irradiate the liquid resin in the printing region to provide energy to form the current cured layer. In some embodiments, the elastic layer may further include an elastic medium of the elastic layer and a reinforcing scaffold. The elastic medium of the elastic layer may be filled in pores of the reinforcing scaffold. In some embodiments, the reinforcing scaffold in the elastic layer may include a plurality of protrusions on a lower surface of the elastic layer. The plurality of protrusions may be in contact with the bottom surface of the resin tank.

In still another aspect of the present disclosure, a method for preparing a 3D object is disclosed. The method may include providing a printing region, the printing region being defined by a build platform and a resin tank of liquid resin including a photocuring surface, wherein a bottom portion of the resin tank of liquid resin is transparent, and a composite release film is placed on the bottom portion of the resin tank of liquid resin, the composite release film including a plastic layer and an elastic layer, an upper surface of the plastic layer being the photocuring surface that is a contact surface with the liquid resin, and a lower surface of the plastic layer fitting with an upper surface of the elastic layer; filling the printing region with the photocurable liquid resin; exposing the printing region to energy to form a current cured layer, the current cured layer being driven, by the build platform, to move away from the photocuring surface; and repeating the above operations until the 3D object is printed. In some embodiments, the elastic layer may further include an elastic medium of the elastic layer and a reinforcing scaffold. The elastic medium of the elastic layer may be filled in pores of the reinforcing scaffold. In some embodiments, the reinforcing scaffold in the elastic layer may include a plurality of protrusions on a lower surface of the elastic layer. The plurality of protrusions may be in contact with a bottom surface of the resin tank.

Those skilled in the art may understand the technical features and technical advantages of elements, devices, and methods disclosed in the present disclosure from the following detailed descriptions. It should be noted that the elements, devices, and methods have various forms of embodiments, but the following descriptions may include specific embodiments. Those skilled in the art should understand that the embodiments of the present disclosure are illustrative and do not limit the present disclosure to the specific embodiments described herein.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, and wherein.

DETAILED DESCRIPTION

Figure 1:
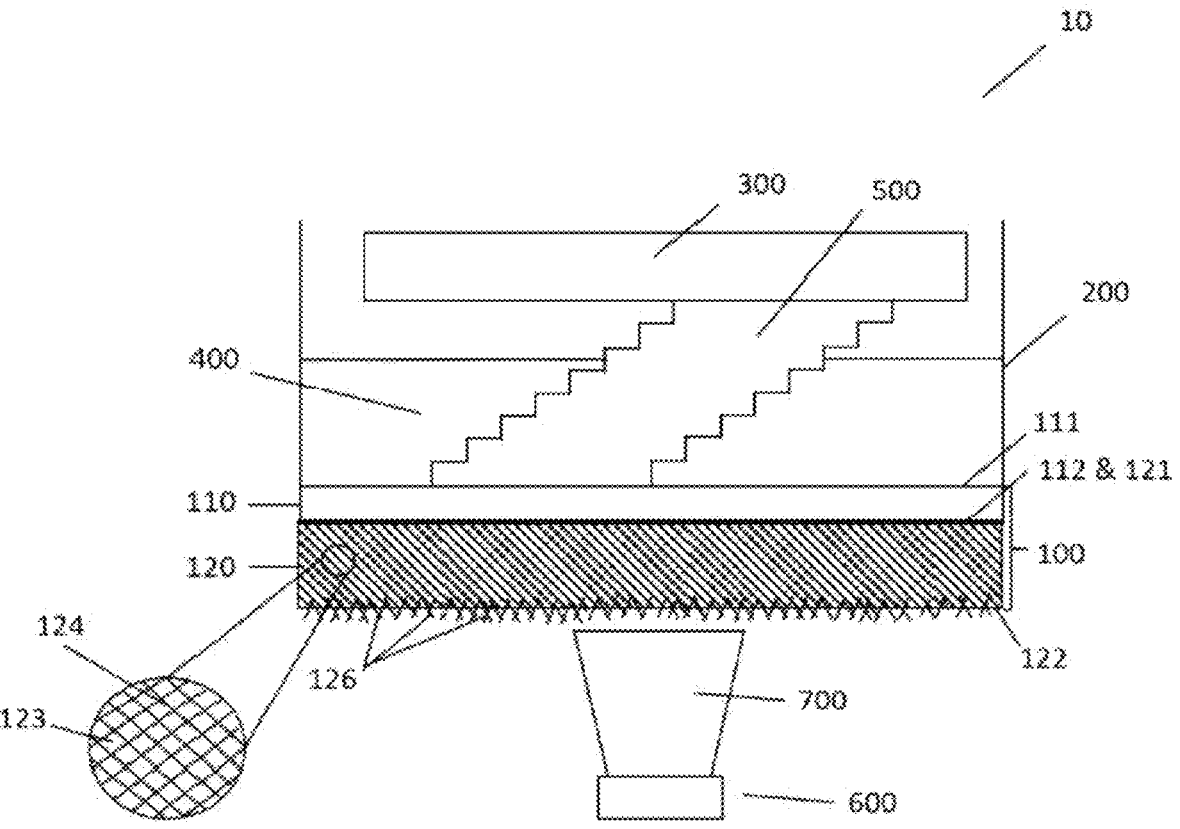
FIG. 1 is a schematic diagram illustrating an exemplary device for photocuring 3D printing according to some embodiments of the present disclosure.

In order to more clearly illustrate the purpose, the technical solutions, and the advantages of the embodiments of the present disclosure, the following will briefly introduce the accompanying drawings needed in the description of the embodiments. It should be understood that the specific embodiments described herein are only used to explain the present disclosure and do not limit the present disclosure. On the contrary, the present disclosure covers any substitution, modification, equivalent method, and scheme defined by the claims on the essence and scope of the present disclosure. Further, in order to give the public a better understanding of the present disclosure, some specific details are described in the following detailed description of the present disclosure. For those skilled in the art, the present disclosure may be fully understood without the description of these details.

Space-related terms, such as "below," "under," "lower," "above," "upper," etc., may be used herein for ease of description to describe a relationship between an element or component as shown in the drawings and one or more other elements or components. It should be understood that the space-related terms are intended to include different orientations of devices in use or operation in addition to the orientations depicted in the drawings. For example, if the devices in the drawings are reversed, the elements described as "below" or "lower" other elements or components may be oriented "above" other elements or components. Thus, the exemplary term "below" may include both upper and lower orientations. The device may be oriented in other ways (rotated 90 degrees or other orientations), and the space-related descriptors used in the present disclosure may be accordingly explained. Similarly, unless otherwise expressly indicated, the terms "up," "down," "vertical," "horizontal," etc., are used herein merely for explanation.

As described in BACKGROUND, in the traditional bottom-up printing, the separation process between the current cured layer modeled at the bottom portion of the resin tank of the liquid resin and the photocuring surface may cause damage to the fine structure of the cured layer. In addition, the separation process may also restrict the printing speed. In the prior art, a release film made of an elastic polymer material and placed on the bottom portion of the resin tank is usually used to facilitate the rapid release. For example, an elastic release film is disclosed in U.S. Pat. No. 7,438,846. The elastic release film needs to select a suitable material to ensure that the elastic release film does not stick to the bottom portion of the resin tank. During the release process, an adhesion force between the cured layer and the release film needs to be greater than an adhesion force between the release film and the bottom portion of the resin tank, so as to ensure that the release film may be elastically deformed by an increase of the adhesion force between the cured layer and the release film at a beginning of the release process, and a portion of the release film may leave the bottom surface of the resin tank. At this time, the elasticity of the elastic release film may provide an elastic recovery force. When the elastic recovery force is greater than the adhesion force between the cured layer and the release film, the release film may peel off from the cured layer and restore an initial shape of the release film. The use of the elastic release film may avoid a previous process that the cured layer needs to be peeled directly from the bottom portion of the resin tank, and greatly improve the printing speed and continuity. The elastic release film disclosed in the U.S. Pat. No. 7,438,846 may adopt an elastic material, such as latex, silicone rubber, etc.

The material of the elastic release film used in the prior art is prone to "aging." That is, after printing for a period of time, since a local position is repeatedly pulled up and then peeled off, a portion of the elastic recovery force provided by the elastic release film is attenuated, and a release effect becomes worse. In addition, when some printing resin materials used for photocuring printing include molecules with small molecular weight, the molecules may enter a 3D network structure of the elastic release film, and a "swell" occurs. The swelling phenomenon may also affect the mechanical properties of the elastic release film and reduce the release effect. A composite release film disclosed in the present disclosure may solve the above problems in terms of the structure and the material selection, and also provide some additional advantages.

FIG. 1 is a schematic diagram illustrating an exemplary device for photocuring 3D printing according to some embodiments of the present disclosure. In some embodiments, the device 10 for photocuring 3D printing may include a resin tank 200 for storing a photocurable resin 400, and a composite release film 100 placed on a bottom portion of the resin tank 200. The bottom portion of the resin tank 200 may be transparent. The composite release film 100 may include an upper plastic layer 110 and a lower elastic layer 120. An upper surface 111 of the plastic layer 110 may be in contact with the photocurable resin 400, and a lower surface 112 of the plastic layer 110 may fit with an upper surface 121 of the elastic layer 120. The device 10 for photocuring 3D printing may also include a build platform 300 for driving a movement of a 3D printed part 500. The build platform 300 and the upper surface 111 of the plastic layer 110 may define a printing region. The device 10 for photocuring 3D printing may also include a light source 600 for supplying energy 700 to the printing region to cure the irradiated photocurable resin. In a typical process of preparing a 3D object using the device 10 for photocuring 3D printing, a control system (not shown in FIG. 1) of the device 10 for photocuring 3D printing may irradiate a pattern of a current cured layer onto the printing region using the light source 600. The energy 700 radiated by the light source 600 may cure the photocurable resin 400 in the printing region to form the current cured layer, and the current cured layer may be attached to the build platform 300. If the cured layer is not a first cured layer, the cured layer may be attached to a last cured layer. After the photocuring process is completed, the build platform 300 may drive all cured layers to move up a certain distance, thereby driving the current cured layer to separate from the upper surface 111 (i.e., a photocuring surface, also referred to as a cured layer release surface) of the plastic layer 110, and then the photocurable resin 400 may flow to fill a space generated after the current cured layer is released. That is, a next cured layer may be printed. The operations may be repeated until the entire 3D printed part 500 is printed.

A definition of the "plastic layer" used in the present disclosure may be used to distinguish the "elastic layer" by name, and neither refer to materials with high compressive tensile strength or capable of producing large plastic deformation, nor intend to distinguish different characteristics of stress-strain curves of the materials of the two layers in the composite release film. In some embodiments, an elastic modulus of a material of the plastic layer of the composite release film disclosed in the present disclosure may be greater than an elastic modulus of a material of the elastic layer of the composite release film. In some embodiments, the elastic modulus of the material of the plastic layer of the composite release film disclosed in the present disclosure may be within a range of 0.1 Mpa to 100 Mpa. The elastic modulus of the material of the elastic layer of the composite release film disclosed in the present disclosure may be less than the elastic modulus of the material of the plastic layer of the composite release film. In some embodiments, the elastic modulus of the material of the elastic layer of the composite release film disclosed in the present disclosure may be within a range of 0.1 Mpa to 100 Mpa.

The composite release film disclosed in the present disclosure may adopt a composite structure. The upper surface of the plastic layer may be used as the photocuring surface. The material of the upper surface of the plastic layer may not be dissolved with the photocurable resin. In some embodiments, the material of the plastic layer of the composite release film and the photocurable resin may not be wetted with each other. Therefore, when the photocurable resin is cured on the upper surface of the plastic layer to form the cured layer, an adhesion force between the cured layer and the plastic layer may be small, which facilitates a separation of the cured layer and the photocuring surface. The definition of "not wetted" disclosed in the present disclosure may be that a contact angle between the photocurable resin and the upper surface of the plastic layer is not less than 60 degrees. In some embodiments, the contact angle between the photocurable resin and the upper surface of the plastic layer is not less than 70 degrees. In some embodiments, the contact angle between the photocurable resin and the upper surface of the plastic layer is not less than 80 degrees. In some embodiments, the contact angle between the photocurable resin and the upper surface of the plastic layer is not less than 90 degrees.

A resistance to swelling of the material of the plastic layer may be better than a resistance to swelling of the material of the elastic layer, so as to avoid small molecules included in the photocurable liquid resin from entering the material of the release film and swelling. In the composite structure, the elastic layer may be configured to provide the elastic recovery force in the release process. The elastic modulus of the material of the plastic layer may be larger than the elastic modulus of the material of the elastic layer. Since the plastic layer and the elastic layer need to go through the process of lifting and peeling together during the releasing process, an interface stress between the two layers may be small. The interface stress may include a compressive stress, a tensile stress, an extrusion stress, a shear stress, or the like, or any combination thereof. If a difference between the elastic modulus of the material of the plastic layer and the elastic modulus of the material of the elastic layer is too large, the interface stress of the materials of the two layers may accordingly increase. Therefore, the elastic modulus of the material of the plastic layer should not exceed the elastic modulus of the material of the elastic layer too much. In some embodiments, a ratio of the difference between the elastic modulus of the material of the plastic layer and the elastic modulus of the material of the elastic layer to the elastic modulus of the material of the elastic layer may not be larger than 20%. That is, the elastic modulus of the material of the plastic layer may not be larger than 1.2 times of the elastic modulus of the material of the elastic layer. In some embodiments, the ratio of the difference between the elastic modulus of the material of the plastic layer and the elastic modulus of the material of the elastic layer to the elastic modulus of the material of the elastic layer may not be larger than 15%. In some embodiments, the ratio of the difference between the elastic modulus of the material of the plastic layer and the elastic modulus of the material of the elastic layer to the elastic modulus of the material of the elastic layer may not be larger than 10%. In some embodiments, the ratio of the difference between the elastic modulus of the material of the plastic layer and the elastic modulus of the material of the elastic layer to the elastic modulus of the material of the elastic layer may not be larger than 5%. In some embodiments, the ratio of the difference between the elastic modulus of the material of the plastic layer and the elastic modulus of the material of the elastic layer to the elastic modulus of the material of the elastic layer may not be larger than 3%. In some embodiments, the ratio of the difference between the elastic modulus of the material of the plastic layer and the elastic modulus of the material of the elastic layer to the elastic modulus of the material of the elastic layer may not be larger than 1%.

In some embodiments, exemplary materials of the plastic layer of the composite release film disclosed in the present disclosure may include polytetrafluoroethylene (PTFE), polyethylene (PE), polyvinylidene fluoride (PVDF), fluorinated ethylene propylene (FEP), perfluoroalkoxy resin (PFA), polychlorotrifluoroethylene (PCTFE), ethylene-tetrafluoroethylene copolymer (ETFE), polyvinyl fluoride (PVF), polyethylene terephthalate (PET), polybutylene terephthalate (PBT), thermoplastic polyurethane (TPU), polyamide (PA) (or nylon), polyimide (PI), polypropylene (PP), polyvinyl chloride (PVC), polymethylmethacrylate (PMMA), polystyrene (PS), polybutene (PB), polyoxymethylene (POM), polycarbonate (PC), polysulfone (PSU), polyphenylene oxide (PPO), polyvinyl alcohol (PVA), polyacrylonitrile-styrene (AS), polyacrylonitrile-butadiene-styrene (ABS), fluoroethylene resin (FR), or the like, or any combination thereof (e.g., a polymer including optional two or more of the polymers, a blend polymer, or a block polymer, or an interpenetrating network polymer formed by polymerization of their monomers).

In some embodiments, the elastic layer 120 of the composite release film 100 disclosed in the present disclosure may be shown in an enlarged portion of FIG. 1. The elastic layer 120 may include a reinforcing scaffold 124 and an elastic medium 123 of the elastic layer 120 filled in the reinforcing scaffold 124. The elastic layer 120 may be configured to provide the elastic recovery force during the release process. The reinforcing scaffold 124 in the elastic layer 120 may be configured to improve a mechanical strength of the elastic layer 120, so that the usage time of the elastic layer 120 may be improved. The elastic medium 123 of the elastic layer 120 may be configured to provide the elastic recovery force during the release process. In some embodiments, an elastic modulus of a material of the reinforcing scaffold 124 in the elastic layer 120 may be larger than an elastic modulus of a material of the elastic medium 123 of the elastic layer 120. In some embodiments, a ratio of a difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 20%. That is, the elastic modulus of the material of the reinforcing scaffold 124 of the elastic layer 120 may not be larger than 1.2 times of the elastic modulus of the material of the elastic medium 123 of the elastic layer 120. In some embodiments, the ratio of the difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 15%. In some embodiments, the ratio of the difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 10%. In some embodiments, the ratio of the difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 5%. In some embodiments, the ratio of the difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 3%. In some embodiments, the ratio of the difference between the elastic modulus of the material of the reinforcing scaffold 124 of the elastic layer 120 and the elastic modulus of the material of the elastic medium 123 of the elastic layer 120 to the elastic modulus of the material of the elastic medium 123 of the elastic layer 120 may not be larger than 1%. In some embodiments, in order to further reduce the interface stress between the plastic layer and the elastic layer, the material of the reinforcing scaffold in the elastic layer may be the same as the material of the plastic layer. In some embodiments where the elastic layer of the composite release film includes the elastic medium of the elastic layer and the reinforcing scaffold, when suitable materials of the elastic layer and the plastic layer are selected by comparing the elastic moduli, the elastic modulus of the material of the plastic layer and the elastic modulus of the material of the elastic medium of the elastic layer may be compared. That is, the comparison may be performed by taking the elastic modulus of the material of the elastic medium of the elastic layer as the elastic modulus of the material of the elastic layer.

In some embodiments, the reinforcing scaffold in the elastic layer of the composite release film disclosed in the present disclosure may be composed of polymer fiber materials and may have a plurality of structures. In some embodiments, the reinforcing scaffold in the elastic layer may be a spiderweb-like microporous structure, wherein the micropores may be formed by interconnected polymer microfibers. In some embodiments, the reinforcing scaffold in the elastic layer may be composed of short polymer fiber materials arranged in an orderly manner, wherein short polymer fibers may be parallel to each other so as not connected. In some embodiments, the reinforcing scaffold in the elastic layer may be composed of the short polymer fiber materials arranged disorderly. In some embodiments, a diameter of the polymer fiber materials of the reinforcing scaffold in the elastic layer of the composite release film disclosed in the present disclosure may be within a range of 50 nanometers to 10 microns, 100 nanometers to 5 microns, or 200 nanometers to 2 microns. In some embodiments, the reinforcing scaffold in the elastic layer of the composite release film disclosed in the present disclosure may be a porous PTFE film. A surface morphology of the porous PTFE film may be a spiderweb-like microporous structure, and pores may be formed between PTFE microfibers. The microporous structure may be formed by entanglement and connection of the plurality of microfibers. A diameter of the pores may be within a range of 50 nanometers to 10 microns. In some embodiments, a longitudinal cross-section of the PTFE film may be a network structure. A 3D structure of the micropores may include complex changes, such as a network connection, a hole inlay, a hole bending, etc. For example, a channel may be composed of the plurality of micropores. Alternatively, a micropore may be connected with a plurality of channels. Exemplary materials of the reinforcing scaffold in the elastic layer may include PE, PVDF, FEP, PFA, PCTFE, ETFE, PVF, PET, PBT, TPU, PA, PI, PP, PVC, PMMA, PS, PB, POM, PC, PSU, PPO, PVA, AS, ABS, FR, or the like, or any combination thereof (e.g., a polymer including optional two or more of the polymers, a blend polymer, or a block polymer, or an interpenetrating network polymer formed by polymerization of their monomers). In some embodiments, the material of the reinforcing scaffold in the elastic layer of the composite release film disclosed in the present disclosure may be the same as the material of the plastic layer of the composite release film.

In some embodiments, the material of the elastic medium of the elastic layer of the composite release film disclosed in the present disclosure may be any suitable elastomer. Exemplary materials of the elastic medium of the elastic layer may include polyester elastomers, propylene-based elastomers, styrene elastomers, olefin elastomers, diene elastomers, vinyl chloride elastomers, lipid elastomers, amide elastomers, siloxane polymers, epoxy polymers, silicone elastomers, organic fluorine elastomers, or the like, or any combination thereof. In some embodiments, the material of the elastic medium of the elastic layer may include silicone, rubber, silicone rubber, thermoplastic vulcanizate (TPV), nitrile butadiene rubber (NBR), butyl rubber, thermoplastic polyurethane (TPU), thermoplastic polyester elastomer (TPEE), polyamide thermoplastic elastomer (TPAE), T-NR-trans-polyisoprene rubber (TPI), trans-1,4-polybutadiene (TPB), organic fluorine thermoplastic elastomer (TPF), thermoplastic phenolic resin (NOVALC resin), thermoplastic chloride polyethylene (TCPE), methyl chlorosilane, ethyl chlorosilane, benzene chlorosilane, thermoplastic polyvinyl chloride elastomer (PVC), polydimethylsiloxane (PDMS), polyethylene, polystyrene, polybutadiene, polyurethane, polyisoprene, polyolefin elastomer (POE), ethylene-propylene-diene monomer (EPDM), styrene ethylene butylene styrene rubber (SEBS), styrene-butadiene-styrene rubber (SBS), polyether block amide (PEBA), ethylene-vinylacetate copolymer (EVA, EVM), linear low density polyethylene (LLDPE), polyacrylate rubber, fluorosilicone rubber, fluoroelastomer, or the like, or any combination thereof (e.g., a polymer including optional two or more of the polymers, a blend polymer, or a block polymer, or an interpenetrating network polymer formed by polymerization of their monomers).

In some embodiments, a preparation of the elastic layer of the composite release film including the reinforcing scaffold and the elastic medium of the elastic layer disclosed in the present disclosure may include the following operations. 1) Reactive precursor components of the materials of the elastic medium of the elastic layer may be measured, respectively, and the reactive precursor components of the materials of the elastic medium of the elastic layer may be mixed in ration. 2) The material of the reinforcing scaffold may be impregnated in a mixture of the reactive precursor components of the material of the elastic medium of the elastic layer before the material of the elastic medium of the elastic layer is cured. The material of the reinforcing scaffold may be in a form of a fiber structure or a porous polymer film. 3) Appropriate reaction conditions may be selected to make the reactive precursor components of the material of the elastic medium of the elastic layer polymerize in the reinforcing scaffold and cure to the elastic medium of the elastic layer, so as to complete the preparation of the elastic layer of the composite release film. In some embodiments, the mixture of the reactive precursor components of the elastic medium of the elastic layer may be liquid. A technique that is used to impregnate the reinforcing scaffold of the elastic layer in the mixture, and make the reactive precursor components of the material of the elastic medium of the elastic layer polymerize in the reinforcing scaffold and cure to the elastic medium of the elastic layer to form the composite release film disclosed in the present disclosure may include hand layup, spraying, winding, resin transfer molding, vacuum infusion, pultrusion, reaction injection pultrusion, extrusion, weaving pultrusion, lamination, molding, sheet molding compound pressing, lump molding compound pressing, injection, reaction injection, prepreg molding, autoclave molding, pipe rolling, centrifugal rotary molding, blow molding, slush molding, or the like, or any combination thereof, selected from a composite material molding process.

As shown in FIG. 1, in some embodiments of the composite release film disclosed in the present disclosure, the reinforcing scaffold 124 of the elastic layer 120 may extend beyond a lower surface 122 of the elastic layer 120 to form a plurality of protrusions 126. For a clear example, a structure of the plurality of protrusions 126 at the lower surface 122 of the elastic layer 120 in FIG. 1 may be enlarged rather than shown in ration. The plurality of protrusions 126 may be located between the lower surface 122 of the elastic layer 120 and a bottom surface of the resin tank 200, thereby reducing a contact area between the lower surface 122 of the elastic layer 120 and the bottom surface of the resin tank 200. Only the plurality of protrusions 126 may be in contact with the bottom surface of the resin tank 200. Reducing the contact area between the lower surface of the elastic layer and the bottom surface of the resin tank may reduce the adhesion force between the elastic layer and the bottom portion of the resin tank, so as to help a deformation process in which the elastic layer and the plastic layer are lifted together by the cured layer during the release process, and reduce a deformation time. The elastic layer deformed by the lifting may provide the elastic recovery force required for the subsequent cured layer to be peeled from the plastic layer. The plurality of protrusions may also help the elastic layer to be lifted by eliminating a cavity with negative pressure and hence, pulling down the elastic layer that may be formed between the lower surface of the elastic layer and the bottom surface of the resin tank, thereby further helping deformation of the elastic layer.

A resolution of the object obtained by the photocuring 3D printing may be limited by a resolution of the used light source. In some embodiments, even if a photocuring printed part is printed using a transparent resin material, a large amount of pixels may be displayed on a surface of the photocuring printed part, which may affect the transparency of the printed part. The plurality of protrusions may introduce a gas-solid interface between the lower surface of the elastic layer and the bottom surface of the resin tank, so that a portion of incident light passing through the optically transparent bottom surface of the resin tank may be refracted. The refraction may cause blurring of a boundary of each curing pixel of the cured layer at a macroscopic level, thereby improving the transparency of the printed part.

In some embodiments, a preparation of the plurality of protrusions of the reinforcing scaffold on the bottom surface of the elastic layer may include the following operations. 1) The reactive precursor components of the materials of the elastic medium of the elastic layer may be measured, respectively, and the reactive precursor components of the materials of the elastic medium of the elastic layer may be mixed in ration. 2) The liquid mixture of the reactive precursor components of the material of the elastic medium of the elastic layer may be coated on a substrate material before the material of the elastic medium of the elastic layer is cured. In some embodiments, the substrate material may include glass or other suitable materials. 3) The material of the reinforcing scaffold may be coated on the mixture of the reactive precursor components of the material of the elastic medium of the elastic layer. The liquid mixture of the reactive precursor components of the material of the elastic medium of the elastic layer may penetrate into pores of the reinforcing scaffold through capillary action. The material of the reinforcing scaffold with a suitable ration may be selected, and simultaneously, an upper surface of the reinforcing scaffold may not be covered by the cured material of the elastic medium of the elastic layer through the action of gravity, thereby ensuring that a surface of the cured elastic layer away from the substrate material includes the plurality of protrusions of the material of the reinforcing scaffold. 4) Appropriate reaction conditions may be selected to polymerize the reactive precursor components of the material of the elastic medium of the elastic layer, and the elastic medium of the elastic layer may be cured. 5) The cured elastic layer may be peeled off from the substrate material, so as to complete the preparation of the elastic layer of the composite release film.

In some embodiments, a thickness of the plastic layer of the composite release film disclosed in the present disclosure may be selected within a range of 5 microns to 50 microns. In some embodiments, the thickness of the plastic layer of the composite release film may be selected within a range of 10 microns to 40 microns. In some embodiments, the thickness of the plastic layer of the composite release film may be selected within a range of 20 microns to 30 microns. In some embodiments, a thickness of the elastic layer of the composite release film disclosed in the present disclosure may be selected within a range of 10 microns to 8 millimeters. In some embodiments, the thickness of the elastic layer of the composite release film may be selected within a range of 20 microns to 5 millimeters. In some embodiments, the thickness of the elastic layer of the composite release film may be selected within a range of 50 microns to 5 millimeters. In some embodiments, a height of one protrusion of the reinforcing scaffold in the bottom surface of the elastic layer of the composite release film disclosed in the present disclosure may be selected within a range of 100 nanometers to 20 microns. In some embodiments, the height of the protrusion of the reinforcing scaffold in the bottom surface of the elastic layer may be selected within a range of 150 nanometers to 15 microns. In some embodiments, the height of the protrusion of the reinforcing scaffold in the bottom surface may be selected within a range of 200 nanometers to 10 microns.

The plastic layer and the elastic layer (including the elastic medium of the elastic layer and the reinforcing scaffold) of the composite release film disclosed in the present disclosure may be optically transparent. Unless otherwise specified, the "optically transparent" in the present disclosure may refer to that energy used to irradiate the photocurable resin in the printing region to cause a curing reaction may have a transmittance of 1% to 100%. In some embodiments, an "optically transparent" material or element may have a transmittance of at least 40%, at least 50%, at least 60%, at least 70%, at least 80%, or at least 90% to the photocuring energy for irradiating the printing region. The "optically transparent" material or element may allow transmission of a light within a wide range of wavelengths. The wavelengths may include wavelengths corresponding to X-ray radiation, ultraviolet (UV) light radiation, visible light radiation, infrared (IR) radiation, microwave radiation, or the like, or any combination thereof.

In some embodiments, a preparation of the composite release film disclosed in the present disclosure may include the following operations. 1) The elastic layer may be prepared according to the preparation disclosed in the present disclosure. The elastic layer may include the elastic medium of the elastic layer and the reinforcing scaffold. One surface of the elastic layer may include the plurality of protrusions which is the exposed part of the reinforcing scaffold. 2) A film stretching device may be used to fix the surface of the elastic layer with the plurality of protrusions on the substrate material, such as, glass. 3) The plastic layer may be paved on the surface of the elastic layer without the plurality of protrusions composed of the plurality of reinforcing scaffolds, and the plastic layer may be flattened with a roller and/or other devices to ensure that an interface between the plastic layer and the elastic layer has no bubbles and folds. In some embodiments, in operation 2, the elastic layer with the plurality of protrusions may be fixed directly on the substrate material that can be directly used as the bottom portion of the resin tank. In some embodiments, after performing the operation 3, the prepared composite release film stretched over the substrate material on the bottom surface of the resin tank may be directly used for the photocuring 3D printing device. Exemplary substrate materials that can be directly used as the bottom portion of the resin tank for storing the photocurable resin may include glass, low iron glass, sapphire glass, quartz, sodium-calcium (BK7) acrylic acid, fused silica, fused silica, germanium, borosilicate, silicon nitride, or the like, or any combination thereof. In some embodiments, after performing the operation 3, the prepared composite release film may be peeled off from the substrate material used in the operation 2, and then may be placed on the bottom portion of the resin tank of the device for photocuring 3D printing for use.

The composite release film disclosed in the present disclosure may be used in an additive manufacturing of free radical photocuring and cationic photocuring. Exemplary free radical photocurable resin materials may include acrylic acid, methacrylic acid, N-vinyl pyrrolidone, acrylamide, styrene, olefins, halogenated olefins, cycloolefins, maleic anhydride, alkynes, carbon monoxide, functionalized oligomers (e.g., oligomers functionalized with acrylate or methacrylate groups, such as epoxides, urethanes, polyethers, or polyesters), functionalized polyethylene glycol (PEG), or the like, or any combination thereof. Exemplary cationic photocurable resin materials may include epoxy groups, vinyl ether groups, or the like, or any combination thereof. In some embodiments, the resin materials may include styrene compounds, vinyl ethers, N-vinyl carbazole, lactones, lactams, cyclic ethers (e.g., epoxides), cyclic acetals, cyclosiloxanes, or the like, or any combination thereof. For a digital light processing (DLP)/laser cladding deposition (LCD) photocuring 3D printing system, vinyl ethers, acrylates, and methacrylates (including oligomers having the groups) may be preferred.

Another aspect of some embodiments of the present disclosure may disclose a device for preparing a 3D object based on a photocuring 3D printing technique by using the composite release film disclosed in some embodiments of the present disclosure. The device may include following components:

a) a resin tank, configured to contain raw materials for printing including photocurable liquid resin, wherein a bottom surface of the resin tank may be transparent, that is, optically transparent; exemplary optically transparent materials that can be used as the material of the bottom surface of the resin tank may include glass, low iron glass, sapphire glass, quartz, sodium-calcium (BK7) acrylic acid, fused silica, fused silica, germanium, borosilicate, silicon nitride, or the like, or any combination thereof;

b) a composite release film disclosed in the present disclosure placed on a bottom portion of the resin tank, configured to separate a current cured layer from a photocuring surface for fast and continuous printing, the composite release film including a plastic layer and an elastic layer, wherein an upper surface of the plastic layer is the photocuring surface that is a contact surface with the liquid resin, and a lower surface of the plastic layer fits with an upper surface of the elastic layer. In some embodiments, the elastic layer may further include an elastic medium of the elastic layer and a reinforcing scaffold, the elastic medium of the elastic layer being filled in pores of the reinforcing scaffold, and simultaneously, the reinforcing scaffold including a plurality of protrusions on a lower surface of the elastic layer. The plurality of protrusions may be in contact with the bottom surface of the resin tank;

c) a build platform, a space between the build platform and the upper surface of the plastic layer of the composite release film being a printing region; and d) a light source, configured to irradiate the liquid resin in the printing region to provide energy to form the current cured layer. The light source may be one or more light sources. Exemplary light sources may include incandescent lamps, fluorescent lamps, phosphorescent or light-emitting lamps, lasers, light-emitting diodes, or the like, or arrays of the above light sources. In some embodiments, the light source may also include an operable element capable of forming a pattern of the cured layer connected to a device controller. Exemplary elements capable of forming the pattern of the cured layer may include a digital (or deformable) micromirror device (DMD) with DLP, an array of spatial light modulators (SLM) or micro electro mechanical systems (MEMS) mirror, an LCD, a mask (also referred to as a photomask), or the like, or any combination thereof.

Another aspect of some embodiments of the present disclosure may disclose a method for preparing a 3D object using the device for the photocuring 3D printing disclosed in the present disclosure. The method may include following operations:

a) provide a printing region, as shown in FIG. 1, the printing region being defined by the build platform 300 and the resin tank 200 of liquid resin including the photocuring surface 111, wherein a bottom portion of the resin tank 200 of liquid resin is transparent, and the composite release film 100 disclosed in the present disclosure is placed on the bottom portion of the resin tank 200 of liquid resin. The composite release film 100 may include the plastic layer 110 and the elastic layer 120. The upper surface 111 of the plastic layer 110 may be the photocuring surface that is a contact surface with the liquid resin 400. The lower surface 112 of the plastic layer 110 may fit with the upper surface 121 of the elastic layer 120. In some embodiments, the elastic layer may further include an elastic medium 123 of the elastic layer 120 and a reinforcing scaffold 124. The elastic medium 123 of the elastic layer 120 may be filled in pores of the reinforcing scaffold 124, and simultaneously, the reinforcing scaffold 124 may include a plurality of protrusions 126 on the lower surface 122 of the elastic layer 126. The plurality of protrusions 126 may be in contact with the bottom surface of the resin tank 200;

b) filling the printing region with the photocurable liquid resin 400;

c) exposing the printing region to energy 700 to make the photocurable liquid resin 400 in the printing region form a current cured layer, wherein the current cured layer is directly attached to the build platform 300 or a last cured layer;

d) driving the current cured layer, by the build platform 300, to move up a distance, so as to separate the current cured layer from the upper surface 111 of the plastic layer 110 of the composite release film 100; and e) repeating operations c and d until the 3D object is printed.

In the operation c), when the build platform 300 drives the current cured layer to move up, the plastic layer 110 may be locally deformed firstly as the current cured layer is moved up due to the adhesion force between the upper surface 111 of the plastic layer 110 and the current cured layer. The upper surface 121 of the elastic layer may undergo a same deformation due to the adhesion force and the surface tension between the upper surface 121 and the lower surface 112 of the plastic layer 110. When the elastic deformation occurs to a certain extent, the resilience force of the material of the elastic layer 120 may exceed the adhesion force between the upper surface 111 of the plastic layer 110 and the current cured layer, resulting in the peeling of the upper surface 111 of the plastic layer 110 from the current cured layer. The elastic recovery force of the elastic layer 120 may drive the plastic layer 110 and the elastic layer 120 to return to an initial state of the composite release film 100. The surrounding liquid resin 400 may quickly return to a space generated after the upper surface 111 of the plastic layer is peeled from the current cured layer, and the printing of a next cured layer may be continued. The thickness of the elastic layer 120 of the composite release film 100 disclosed in the present disclosure may be larger than the thickness of the plastic layer 110, so as to provide the elastic recovery force for the release process, and ensure that the elastic deformation in the release process may quickly return to the initial state of the composite release film 100. At the same time, the reinforcing scaffold 124 in the elastic layer 120 may provide an internal support, enhance a mechanical strength of the elastic layer 120, and improve a service life of the elastic layer 120. The plurality of protrusions 126 of the reinforcing scaffold 124 of the elastic layer 120 on the lower surface 122 of the elastic layer 120 may reduce the contact area between the lower surface 122 of the elastic layer 120 and the bottom portion of the resin tank 200, which may help the elastic layer 120 to undergo the rapid elastic deformation, and then quickly provide the elastic recovery force to complete the release. At the same time, the help of the plurality of protrusions 126 for the lifting deformation of the elastic layer 120 may eliminate the cavity with negative pressure and hence, pull down the elastic layer between the lower surface 122 of the elastic layer 120 and the bottom surface of the resin tank 200, thereby further promoting the deformation of the elastic layer 120. The plastic layer 110 of the composite release film 100 may provide a resistance to swelling to prevent small molecules in the printing raw material (e.g., the liquid resin) from entering the composite release film 100.

EMBODIMENT

Embodiment 1 Preparation of the Elastic Layer of the Composite Release Film

PDMS (Dow Corning, PDMS, Sylgard 184) was mixed in a mass ratio of 10:1 (bulk: a curing agent) and stirred. After removing bubbles, 200 microns of PDMS was scraped and coated on a glass substrate using a scraper, and then a reinforcing scaffold layer (e.g., a porous PTFE film (Shenzhen Gorestec Technology Co., Ltd., GT-050)) with 50 microns was spread onto a surface of the scraped PDMS.

Figure 2:
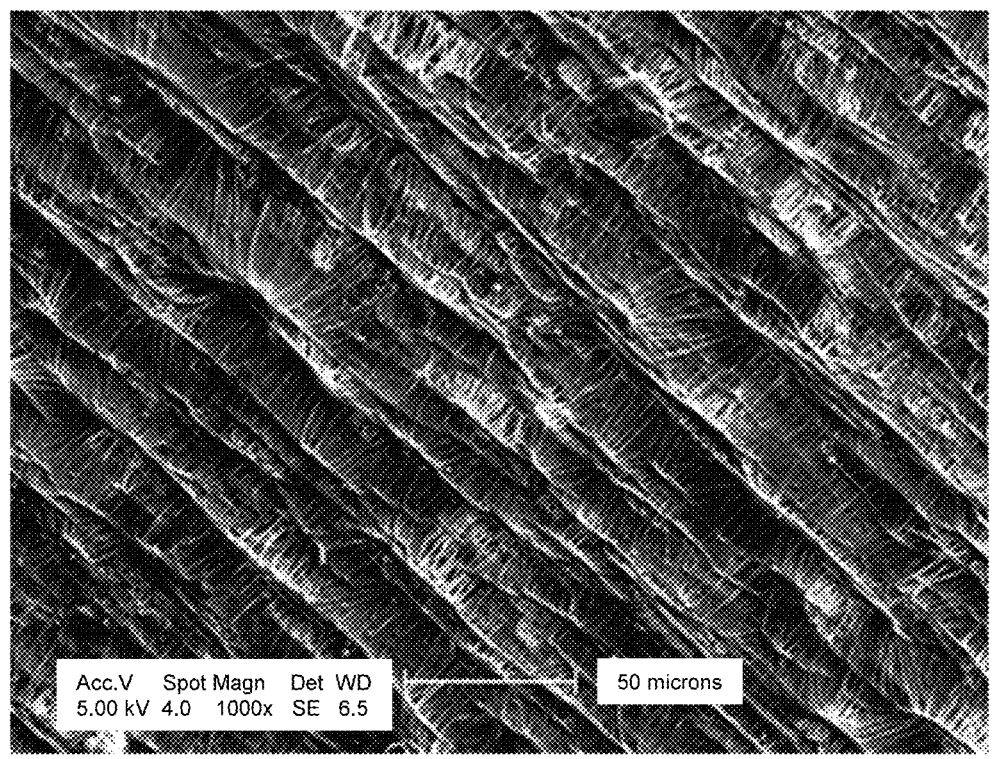
FIG. 2 is an electron microscope diagram illustrating an exemplary elastic layer of a composite release film according to some embodiments of the present disclosure.

The liquid PDMS was permeated into pores of the porous PTFE film due to the capillary action. After the filling, the whole system was placed into an oven for thermal curing at 80° C. for 120 minutes to complete the preparation of the elastic layer. Due to the action of gravity and a predetermined material ration, the PDMS could not cover up all the reinforcing scaffold. Therefore, a portion of the reinforcing scaffold was exposed from an upper surface of the PDMS to form a plurality of microstructure protrusions. FIG. 2 is an electron microscope diagram illustrating an exemplary elastic layer of a composite release film according to some embodiments of the present disclosure. Filamentous structures were PTFE fibers, and pores between PTFE fibers were filled with PDMS elastomers.

Embodiment 2 Preparation of the Composite Release Film

The elastic layer prepared in Embodiment 1 was peeled off from the glass substrate. One side of the elastic layer with exposed protrusions of the reinforcing scaffold was paved on optical glass, and the elastic layer and the optical glass were fixed together to a lower clamping piece of a cassette of the film stretching device. A plastic layer (DuPont, FEP casting film) was paved flat on an upper surface of the elastic layer (i.e., a surface without the protrusions of the reinforcing scaffold). The plastic layer was rolled flat using a roller to ensure that no bubbles, wrinkles, and other structures were between the plastic layer and the elastic layer. An upper clamping piece and the lower clamping piece of the cassette were fixed together, and excess materials of the plastic layer and the elastic layer around the upper clamping piece and the lower clamping piece were cut off to obtain an optical glass cassette with a stretched composite release film. The cassette was directly installed on the corresponding resin tank to form the bottom surface of the resin tank which was optically transparent and covered with the composite release film.

Figure 3:
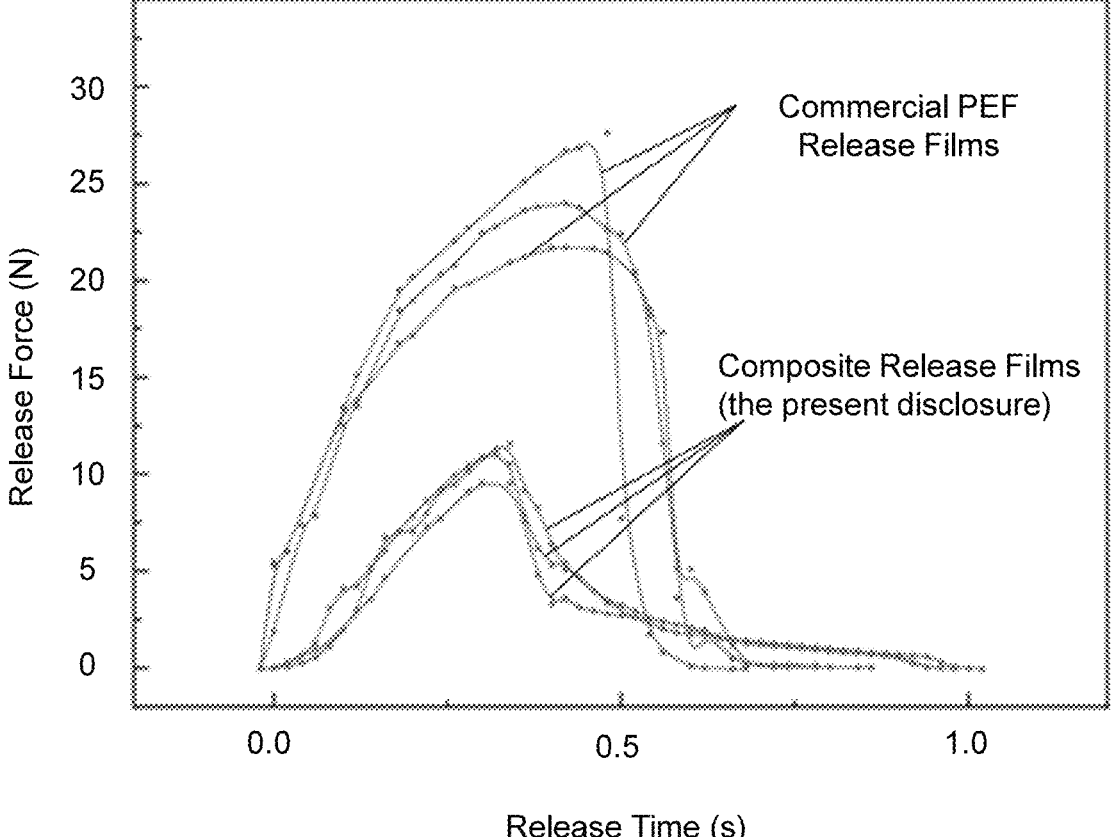
FIG. 3 is a schematic diagram illustrating exemplary comparative experimental data of a release effect test between a composite release film prepared according to some embodiments of the present disclosure and a commercial release film.

Embodiment 3 Printing Release Test of the Composite Release Film and a Commercial FEP Film Three composite release films prepared according to Embodiment 2 and three commercial FEP release films (model F46, Polyfluorocarbon New Material Technology Co., Ltd) were installed at a bottom portion of a matching resin tank of the TP02 printer of LuxCreo™ company, respectively. EM13 resin raw material of LuxCreo™ company was used to print according to following printing parameters. The printing parameters included exposing under 15000 of light intensity for 50 seconds. After the exposure, the build platform was lifted to separate cured layers from the release films. A tensile force tester was used to record the whole process of release, and real-time tensile force data was measured. As shown in FIG. 3, the release films used in each experiment were printed twice at the same position, and release data of three groups of the composite release films and release data of three groups of commercial FEP release films were obtained, respectively. The release data included a release force, a release time, and a release work (an area beneath the release curve in FIG. 3). It can be seen from the release data in FIG. 3 that, compared with the commercial FEP release films, the composite release film disclosed in the present invention may reduce the release force, the release time, and the release work in the total release process, which may significantly improve the performance of the release effect.

Finally, it should be noted that the above embodiments are merely used to describe the technical solution of the present disclosure, and do not limit the scope of the present disclosure. Although the technical solution of the present disclosure has been described in detail with reference to the foregoing embodiments, those skilled in the art should understand that the technical solution recorded in the foregoing embodiments can be modified, or equivalent replacements for some or all of the technical features can be made, and these modifications and equivalent replacements do not make the essence of the corresponding technical solution apart from the scope of the technical solution of the various embodiments of the present disclosure.

What is claimed is:

1. A composite release film, configured to separate a current cured layer from a photocuring surface during a photocuring three-dimensional (3D) printing process, wherein the composite release film includes a plastic layer and an elastic layer, an upper surface of the plastic layer being the photocuring surface, and a lower surface of the plastic layer fitting with an upper surface of the elastic layer; an elastic modulus of a material of the plastic layer being larger than an elastic modulus of a material of the elastic layer material; and a ratio of a difference between the elastic modulus of the material of the plastic layer and the elastic modulus of the material of the elastic layer to the elastic modulus of the material of the elastic layer being not larger than 20%.

2. The composite release film of claim 1, wherein the elastic layer includes an elastic medium of the elastic layer and a reinforcing scaffold, the elastic medium of the elastic layer being filled in pores of the reinforcing scaffold.

3. The composite release film of claim 2, wherein the reinforcing scaffold in the elastic layer includes a plurality of protrusions on a lower surface of the elastic layer.

4. The composite release film of claim 1, wherein a resistance to swelling of a material of the plastic layer is better than a resistance to swelling of a material of the elastic layer.

5. The composite release film of claim 2, wherein an elastic modulus of a material of the reinforcing scaffold in the elastic layer is larger than an elastic modulus of a material of the elastic medium of the elastic layer.

6. The composite release film of claim 5, wherein a ratio of a difference between the elastic modulus of the material of the reinforcing scaffold in the elastic layer and the elastic modulus of the material of the elastic medium of the elastic layer to the elastic modulus of the material of the elastic medium of the elastic layer is not larger than 20%.

7. The composite release film of claim 1, wherein a thickness of the plastic layer is less than a thickness of the elastic layer.

8. The composite release film of claim 1, wherein a material of the plastic layer includes polytetrafluoroethylene (PTFE) or fluorinated ethylene propylene (FEP).

9. The composite release film of claim 2, wherein a material of the elastic medium of the elastic layer includes polydimethylsiloxane (PDMS), polyurethane, or rubber.

10. The composite release film of claim 2, wherein a material of the reinforcing scaffold in the elastic layer includes porous PTFE or porous FEP.

11. The composite release film of claim 3, wherein an average height of the plurality of protrusions on the lower surface of the elastic layer is within a range of 100 nanometers to 20 microns.

12. The composite release film of claim 1, wherein the elastic modulus of the material of the plastic layer is within a range of 0.1 Mpa to 100 Mpa.

13. The composite release film of claim 1, wherein the elastic modulus of the material of the elastic layer is within a range of 0.1 Mpa to 100 Mpa.

14. The composite release film of claim 2, the material of the reinforcing scaffold in the elastic layer is the same as the material of the plastic layer.

15. The composite release film of claim 1, wherein a contact angle between photocurable liquid resin and the upper surface of the plastic layer is not less than 60 degrees.

16. A device for photocuring three-dimensional (3D) printing, comprising:

a resin tank, configured to contain raw materials for printing including photocurable liquid resin, a bottom surface of the resin tank being transparent;

a composite release film placed on a bottom portion of the resin tank, configured to separate a current cured layer from a photocuring surface, the composite release film including a plastic layer and an elastic layer, wherein an upper surface of the plastic layer is the photocuring surface that is a contact surface with the liquid resin, a lower surface of the plastic layer fits with an upper surface of the elastic layer; an elastic modulus of a material of the plastic layer is larger than an elastic modulus of a material of the elastic layer material; and a ratio of a difference between the elastic modulus of the material of the plastic layer and the elastic modulus of the material of the elastic layer to the elastic modulus of the material of the elastic layer is not larger than 20%;

a build platform, a space between the build platform and the upper surface of the plastic layer of the composite release film being a printing region; and a light source, configured to irradiate the liquid resin in the printing region to provide energy to form the current cured layer.

17. The device for photocuring 3D printing of claim 16, wherein the elastic layer includes an elastic medium of the elastic layer and a reinforcing scaffold, the elastic medium of the elastic layer being filled in pores of the reinforcing scaffold.

18. The device for photocuring 3D printing of claim 17, wherein the reinforcing scaffold in the elastic layer includes a plurality of protrusions on a lower surface of the elastic layer, the plurality of protrusions being in contact with the bottom surface of the resin tank.

19. The device for photocuring 3D printing of claim 18, wherein an average height of the plurality of protrusions on the lower surface of the elastic layer is within a range of 100 nanometers to 20 microns.

20. The device for photocuring 3D printing of claim 16, wherein a resistance to swelling of a material of the plastic layer is better than a resistance to swelling of a material of the elastic layer.

* * * * *